Figure 1:
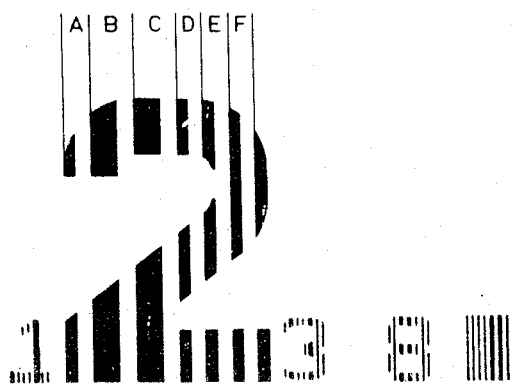

March 14, 1967  H. G. FEISSEL ET AL  3,309,667
CHARACTER IDENTIFYING ARRANGEMENT
Filed April 17, 1961  7 Sheets-Sheet 1

Inventors:
Henri Gerard Feissel
Pierre Alfred Ferrier
and
Marc Charles Joseph Lesueur
By Baldwin & Wight, Attorneys Inventors:
Henri Gerard Feissel
Pierre Alfred Ferrier
and
Marc Charles Joseph Lesueur
By Baldwin & Wight, Attorneys 3,309,667
CHARACTER IDENTIFYING ARRANGEMENT
Henri Gérard Feissel, Paris, Pierre Alfred Ferrier, Villebon, Seine-et-Oise, and Marc Charles Joseph Lesueur, Chaville, Seine-et-Oise, France, assignors to Compagnie des Machines Bull (Societe Anonyme), Paris, France
Filed Apr. 17, 1961, Ser. No. 103,386
Claims priority, application France, July 26, 1960, 834,008, Patent 1,271,150; Mar. 2, 1961, 854,343, Patent 79,378
12 Claims. (Cl. 340—146.3)

The present invention relates to arrangements by means of which documents bearing visually identifiable characters can be analysed in a machine. This invention concerns more especially an arrangement for automatically analysing visually identifiable elements of information. The arrangement according to the invention is specially adapted for analysing characters composed of vertical bars such as those described in United States patent application Ser. No. 845,569, filed on Oct. 9, 1959, Patent No. 3,044,696. In an example given in the said specification, the record carrier to be analysed may be a bank cheque and figures are printed thereon in a magnetisable ink.

Characters of the type described in the aforesaid specification are of uniform width, since they each comprise a like number of bars, a like number of short intervals and a like number of long intervals. There is meant by the term "interval" the distance between the forward edges of two adjacent bars. If the value 1 is arbitrarily attributed to a long interval and the value 0 to a short interval the various characters can readily be distinguished for the purpose of mechanical analysis by means of a combination coding system. A code called "two ones out of five positions" supplies a sufficient number of combinations to distinguish the digits 0 to 9. However, since it is also necessary to distinguish the bordering symbols or a word-beginning and word-ending sign, a code called "2 out of 6" has been adopted, which supplies 15 coded combinations in all, that is to say, five special symbols in addition to the digits. This is why the chosen number of bars is 7. If a particular position is reserved for a long interval in any one of the bordering symbols, this position will serve to distinguish the latter from any digit from 0 to 9.

This method of coded representation is extremely advantageous in that it adapts itself to any irregularities in the printed characters. It permits the use of a relatively simple analysing system and of simple error checking members. Since it is only one particular edge of a bar which has any significance for the mechanised reading, the irregularities emanating from different thicknesses of these bars have substantially no influence on the intervals between reading pulses as long as they do not exceed a certain tolerance. Where a number of adjacent bars are sufficiently thick to be confused, the character would be read as comprising, for example, one bar less than the number of normal bars. A simple pulse counter can be used for this checking.

The "character" entity can also be readily recognised because the analysing devices can distinguish a so-called "very long" interval between bars as well as the "short" and "long" intervals already mentioned. This very long interval is that separating two successive characters. It normally corresponds to a spacing between two consecutive characters and is always distinctly longer than a long interval forming part of a character.

A first object of the invention is to supply an analysing arrangement which is simple to construct and to operate and which is capable of effecting the conversion from time-series into space-parallel of the distinctive parameters allocated to the various characters formed in accordance with the previously defined coding system.

Another object of the invention is to provide a device for analysing characters having bars of the above-defined type, which is very simple to modify or to adjust for adapting it to a modified coding system, for example in the sense of a reduction or extension of the number of characters to be distinguished.

Another object of the invention is to provide a device for analysing characters as hereinbefore defined, which is adapted to detect the defects and malformations of the printed characters and to prevent transmission of erroneous output signals.

Another object of the invention is to provide an analysing arrangement capable of converting a train of reading pulses differently adjusted in time in accordance with a particular code into a group of signals available in parallel at a number of output channels in accordance with the said code.

In accordance with a first aspect of the invention, the aforesaid objects are achieved by employing a method of discriminating time interval values, a method of comparing these values with predetermined limits, and a method of converting from series into parallel under the control of the results of this comparison.

According to the invention, an analysing and converting arrangement comprises reading means adapted to emit an effective reading signal for one edge of each bar, time measuring means successively receiving each of the said reading signals, which signal stops their operating cycle in each instance, the said means being adapted to detect a long interval when the time corresponding to a short interval has been exceeded between two consecutive reading signals, first storage means for momentarily registering a signal indicating such a detection, and second storage means having a number of storage locations, these second storage means being associated with switching means which are actuated step-by-step by the said reading signals in order that the said second storage means may store a binary value characterising a long interval in appropriate storage locations under the control of the said first storage means.

In a first embodiment of the invention, the said time measuring means comprise a pulse counter receiving pulses to be counted from a constant-frequency pulse generator, as also the said reading signals for return to zero, and also a number of logical circuits connected to appropriate outputs of the counter for separately detecting counting values allocated to a long interval and to a very long interval respectively.

In a second embodiment of the invention, the said time measuring means comprise at least one linear time base generator, and two amplitude discriminators associated with the said generator in such manner as to produce a pulse when a long interval and a very long interval, respectively, are detected between two consecutive reading signals, the said first storage means including a first and a second bistable element each associated with one of the said discriminators.

Figure 5:
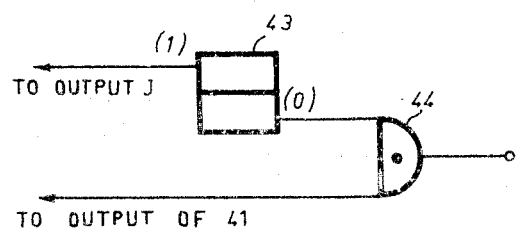
Figure 2A:
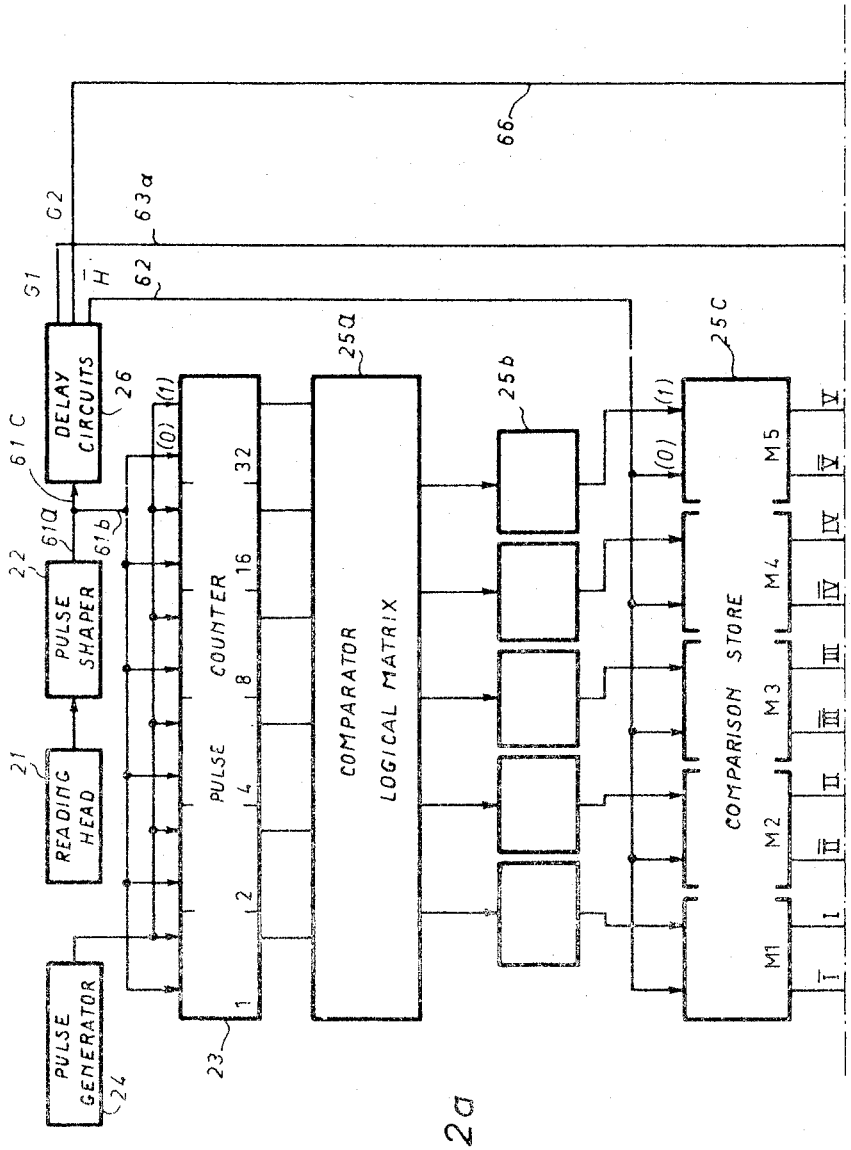
Figure 2B:
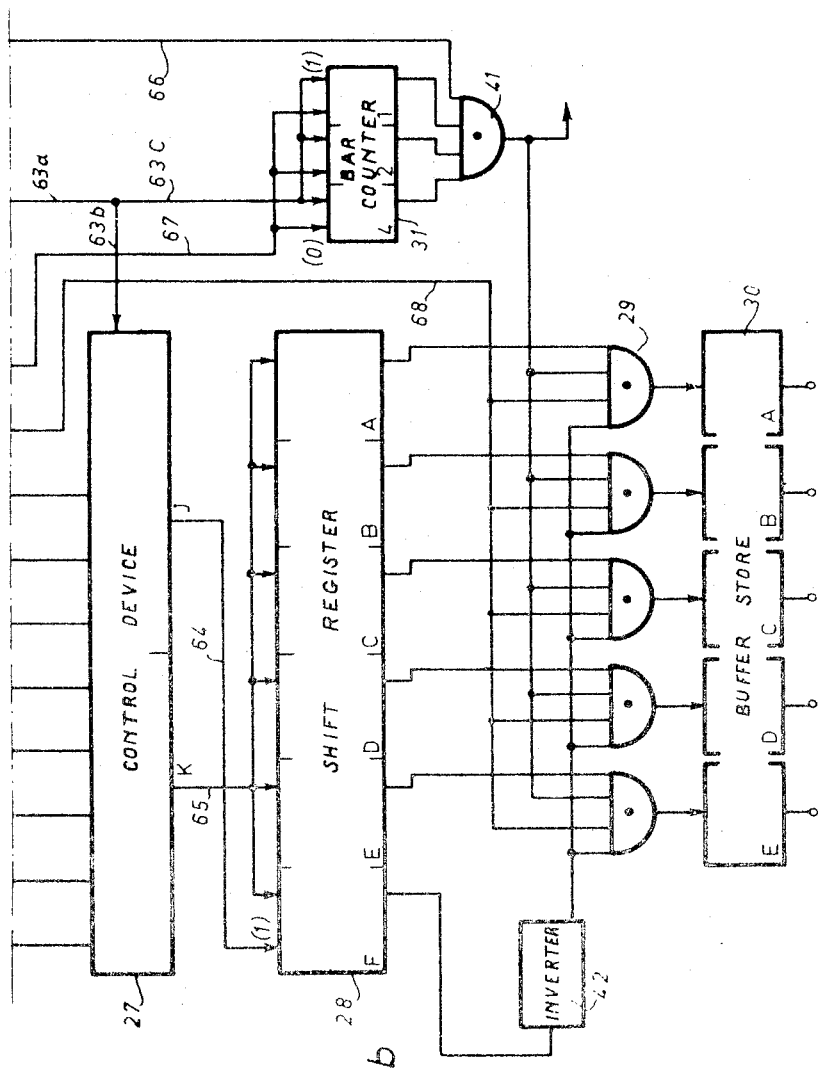
Figure 3:
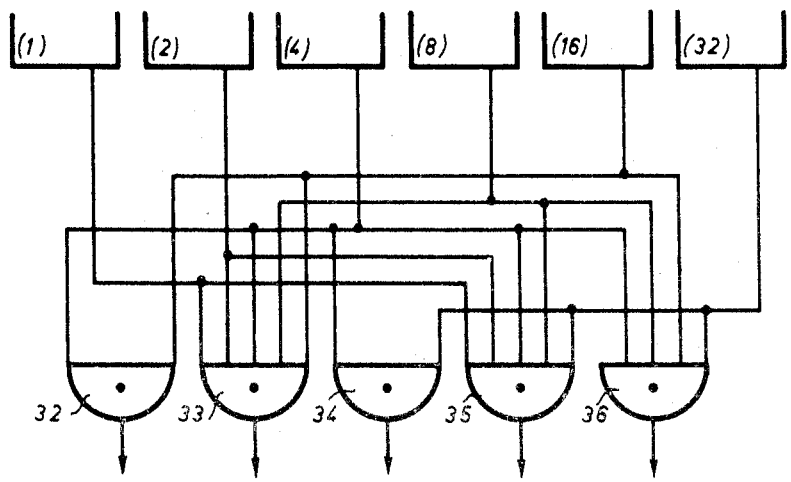
Figure 4:
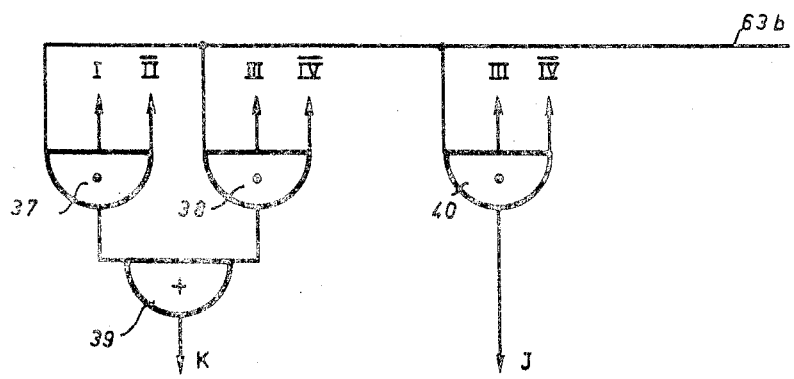
Figure 6A:
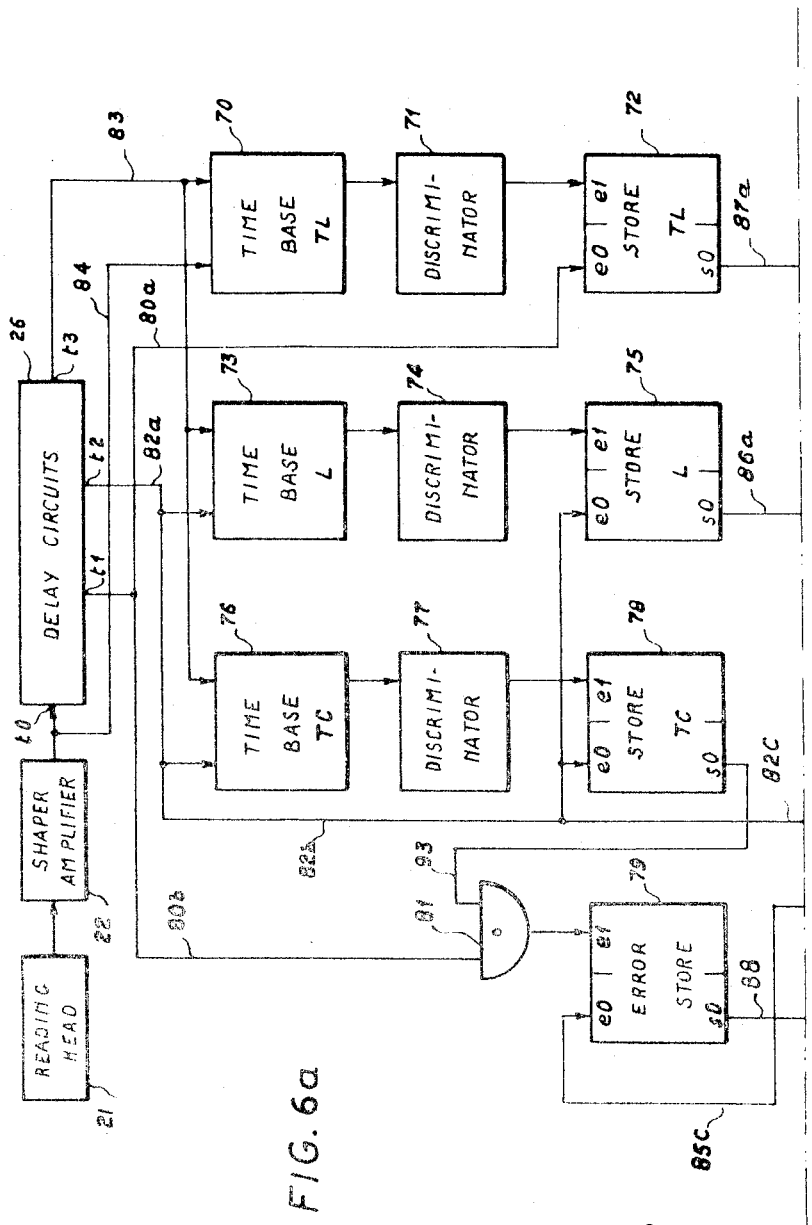
Figure 6B:
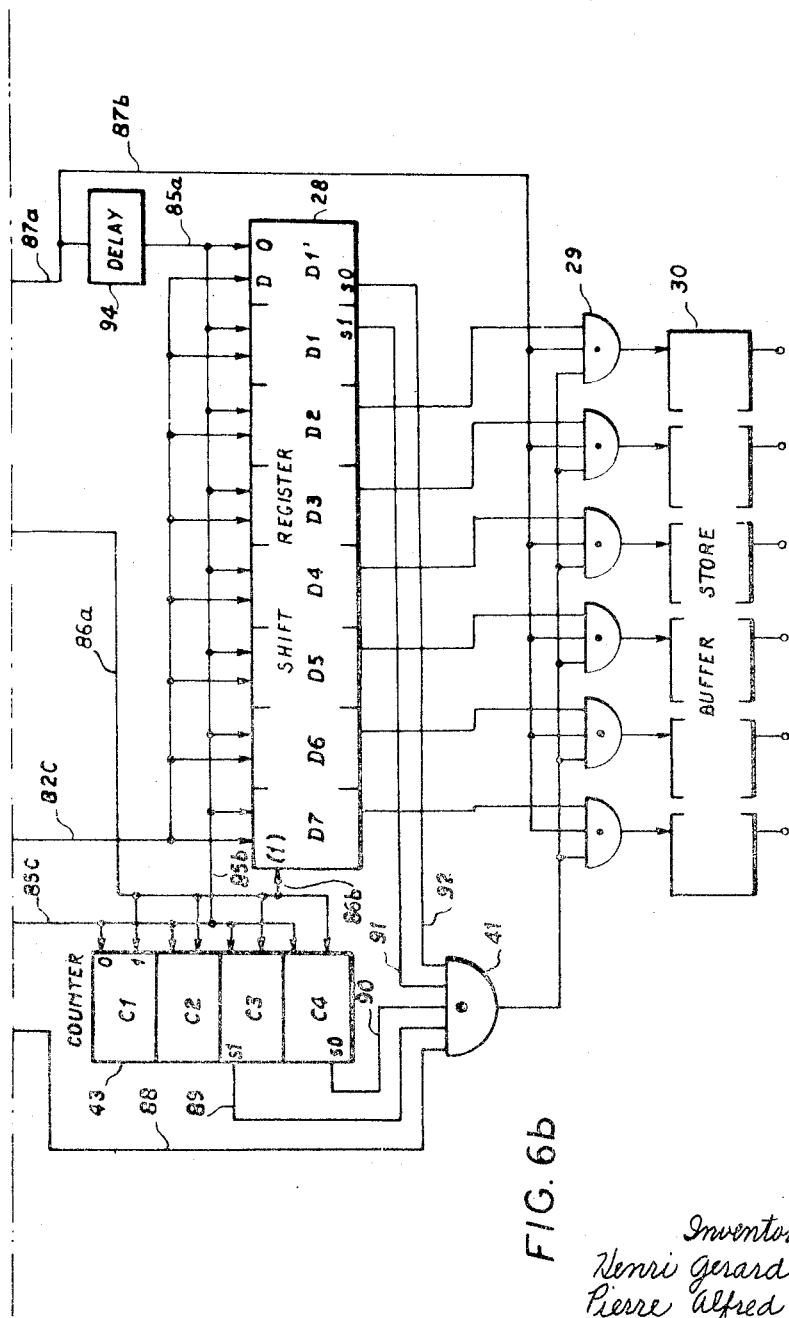
Figure 7:
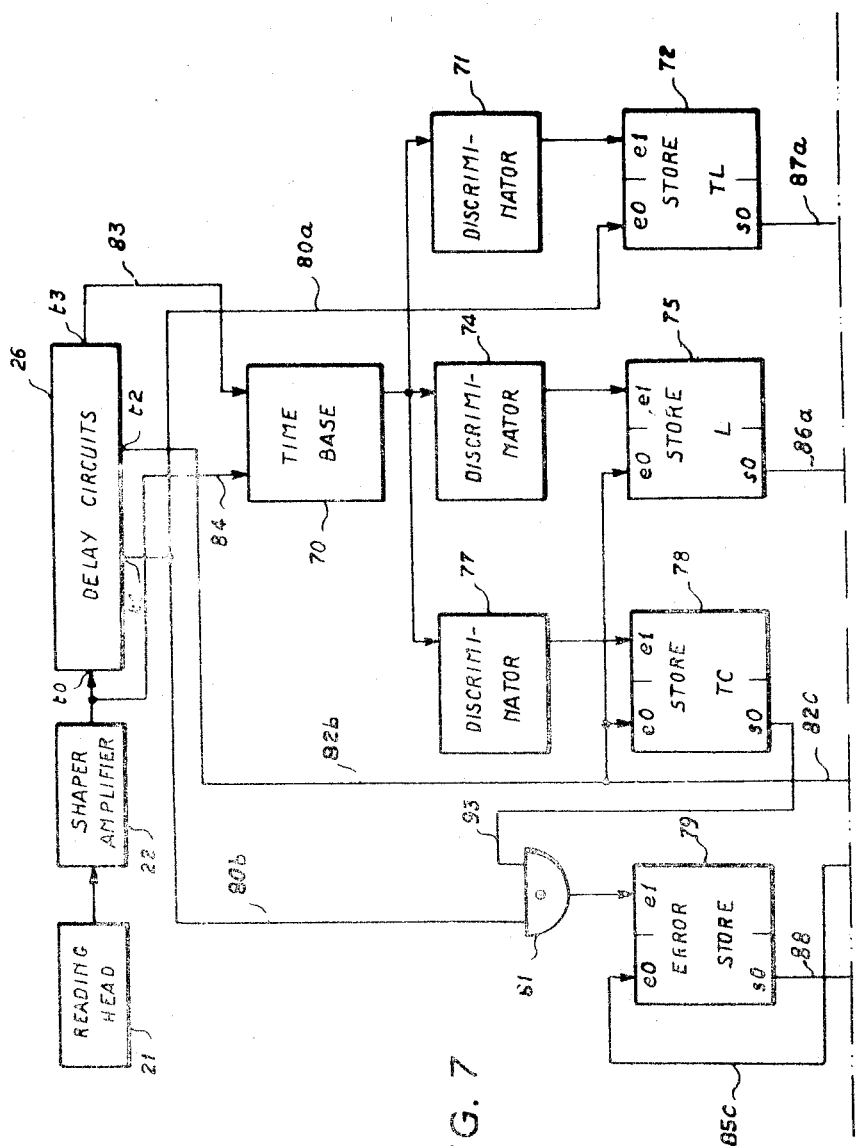

For a better understanding of the invention and the manner in which it may be performed, the same will now be described, by way of example, with reference to the accompanying drawings, in which:

FIGURE 1 shows some of the characters to be analysed,

FIGURES 2a and 2b show a diagram illustrating the (operating) principle of the analysing arrangement according to the invention, FIGURE 3 is a diagram illustrating the principle of the logical comparison matrix, FIGURE 4 is a diagram illustrating the principle of control circuits of the shift register, FIGURE 5 is a diagram illustrating the principle of a non-error detecting device, FIGURES 6a and 6b are a diagram illustrating the principle of the analysing arrangement modified in accordance with a first variant, and FIGURE 7 is a fragmentary diagram intended to be substituted for FIGURE 6a in a further simplified second variant.

The record carrier which is to be analysed may be a bank cheque like that described in the aforementioned patent specification. FIGURE 1 shows some of the digits 0 to 9 and at the extreme right-hand end one of the number bordering symbols. The characters are aligned along a common horizontal line and are formed of vertical bars or portions of bars. It will be noted that even the very short bars of digit 1, for example, can be correctly read by the magnetic reading device.

Referring to the enlarged representation of the digit 2, it will be seen that this comprises, like all the others, seven bars and six intervals between bars. Since it is assumed that the record carrier is moved from right to left during the reading, the forward edges of the bars are on the left in the drawing. Since only the reading pulse resulting from the reading of a forward edge is utilized, the information-carrying parameters are the intervals between these consecutive forward edges. In each character, the six intervals are made up of four short intervals and two long intervals. As previously indicated, if a short interval has the value 0 and if a long interval has the value 1, the following coding table can be prepared:

|   | A | B | C | D | E | F |
|---|---|---|---|---|---|---|
| 0 | 0 | 0 | 0 | 1 | 1 | 0 |
| 1 | 1 | 0 | 0 | 0 | 1 | 0 |
| 2 | 0 | 1 | 1 | 0 | 0 | 0 |
| 3 | 0 | 1 | 0 | 0 | 1 | 0 |
| 4 | 1 | 0 | 0 | 1 | 0 | 0 |
| 5 | 1 | 0 | 1 | 0 | 0 | 0 |
| 6 | 0 | 0 | 1 | 0 | 1 | 0 |
| 7 | 1 | 1 | 0 | 0 | 0 | 0 |
| 8 | 0 | 0 | 1 | 1 | 0 | 0 |
| 9 | 0 | 1 | 0 | 1 | 0 | 0 |
| X | 0 | 0 | 0 | 0 | 1 | 1 |
| Y | 0 | 0 | 1 | 0 | 0 | 1 |
| Z | 1 | 0 | 0 | 0 | 0 | 1 |

The letters A to F correspond to the significant intervals of the characters and the 0's and the 1's indicate the respective positions of the short and long intervals. Thus, in accordance with the above table, the intervals B and C in the digit 2 are long.

In practice, there has been adopted for the widths of a long interval and of a short interval the ratio of 1.67 to 1, which is sufficient for a good discrimination and is space-saving. The smallest spacings between consecutive digits each constitute a "very long" interval. The ratio between a very long interval and a long interval is at least 1.45 to 1. In the above table, the letters X, Y and Z relate to coded combinations allocated to the zone symbols. It is the symbol X which is represented to the right in FIGURE 1.

Although characters of the type illustrated in FIGURE 1 can be read by photoelectric or optical reading means, it will be assumed in the following that the strokes constituting the characters are bars or portions of bars printed in a magnetisable ink. In this case, after magnetisation of the magnetic material by any appropriate means, each bar can be read by a magnetic transducer, of which the air gap extends over the height of the character, and perpendicularly to the direction of advance of the line of characters.

In FIGURE 2a, the character reading transducer is diagrammatically represented at 21. It may be assumed that it is a question of a magnetic reading head which supplies a pulse of positive direction and then a pulse of negative direction when a forward edge and then a rear edge of a magnetic bar successively pass under the air gap of the reading head. The reading signals are transmitted to a device 22 generically called the "pulse shaper." This device is composed of differentiating, rectifying and limiting members adapted to supply at the output of the device a pulse of well-defined polarity, amplitude and duration to any pulse of positive direction received at the input. If necessary a pulse generator 24 exerts an influence on the shaping device 22 in such manner that any pulse at the output of the latter has a fixed duration and a given time relation with a timing pulse supplied by the generator 24. These timing pulses have, for example, a duration of 1 microsecond and a repetition frequency of 200,000 per second.

The device provided for discriminating the time intervals between the successive reading pulses is here illustrated in the form of a pulse counter 23. This counter is of the parallel type. It is composed of a number of interconnected bistable stages which may be of any appropriate known type. Each stage has a "1" input and an "0" input. The "1" inputs simultaneously receive the timing pulses constantly emitted at the output of the generator 24. The "0" inputs of the counter receive in parallel each reading pulse emanating from the output of the shaper 22 through the conductors 61a, 61b. The counter must rapidly supply the quantised value of the time which has elapsed since the last reading signal received.

In relation with each of the short, long and very long intervals, there have been chosen three counted pulse values which are respectively 25, 41 and 60, in accordance with the aforesaid interval ratios. Since the analysing system must permit high flexibility of use, these intervals may vary within relatively wide limits. However, for the purpose of the character correctness checks, these limits must be accurately determined. Thus, the number Nc of pulses counted during a short interval is between 20 and 30 inclusive. The number Nl of pulses counted during a long interval is between 36 and 46 inclusive. A very long interval corresponds to at least 60 counted pulses.

The counter 23 comprises 6 stages allocated respectively to the binary values 1 to 32. Its capacity is therefore in principle 63.

It is to be understood that this capacity has been arbitrarily chosen in accordance with a number of factors such as the speed of movement of the record carrier and the repetition frequency of the counting pulses (or timing pulses). There is no reason why counted values chosen should not be reduced by half, which would make it possible to omit the stage of value 32 of the counter. Likewise, a counter of the parallel type is by no means essential. In the case of a lower speed of operation, it would be possible to use a counter of the series or cascade type which merely has the disadvantage that it requires a longer time for the cascade transmission of the binary carries. In this case, the timing pulses to be counted would be applied along to the "1" input of stage 1.

In all cases, it is known that at least one output signifying a value is available in each stage. For example, a high voltage at this output may signify a "true" value or 1, and a lower voltage may signify a "false" value or 0.

The interval comparing device is here illustrated as being composed of three elements: a logical matrix 25a, a series of amplifiers 25b and a comparison store 25c. The logical matrix is illustrated in greater detail in FIGURE 3. It is composed of five coincidence or AND circuits 32 to 36. Each AND circuit is composed of crystal diodes and resistances. They each have one output and a number of inputs which are connected to the outputs of the bistable stages of the counter in the manner illustrated in the drawing in the case where the comparison limits are predetermined.

The AND circuit 32 supplies at its output a significant voltage when the content of the counter reaches 20. In fact, its inputs are connected to the outputs of value 16 and 4 of the counter. Similarly, the AND circuits 33, 34, 35 and 36 supply a significant output when the values counted by the counter reach the values 31, 36, 47 and 60 respectively.

The five output amplifiers 25b may be simple non-inverting amplifiers or pulse regenerators. From the logical viewpoint, they are not essential. They may be useful for matching the voltage levels. In any case, they transmit a pulse of appropriate duration and amplitude each time a corresponding limit has been exceeded by the content of the counter. It is clear that if a long interval has been detected between two bars, the amplifiers connected to the AND circuits 32, 33 and 34 will each have supplied one pulse.

The store 25c is composed of five bistable elements, each with an "0" input and a "1" input. Their function is to store the information consisting of the output signals of the comparing device until the counter is next reset to zero. Each bistable element has a true output and a complementary output. Thus, the left-hand element has an output I and an output $\bar{I}$. A significant voltage is available at the output $\bar{I}$ when the element has been reset to zero. This significant voltage is available at the output I when the element has received a pulse at the "1" input, that is to say, when the limit 20 has been exceeded by the content of the counter.

A delay device 26 (FIGURE 2a) is provided, which receives the reading signals shaped by the shaping device 22 and which has three outputs G1, G2 and $\bar{H}$. Any known delay elements may be employed here. The output $\bar{H}$ is connected by the conductor 62 to the resetting inputs of the bistable elements of the comparison store 25c. The signal at the output $\bar{H}$ is delayed in relation to the reading pulse and it can be inverted or not depending upon the structure of the bistable elements of the store 25c. In any case, its function is to bring the latter back to the state 0.

The control device 27 has two sections, each of which comprises one or more logical circuits. It is connected on the one hand to the outputs of the elements of the comparison store and on the other hand to the output G1 of the delay device 26 through symbolic channels 63a and 63b. Its logical circuits are shown in detail in FIGURE 4. There are three AND circuits 37, 38 and 40 and one OR circuit 39. The signal G1 emanating from the conductors 63a, 63b and applied to an input of each of the AND circuits is simply a reading signal delayed to correspond to the transmission time necessary between the input of the counter and the output of the comparison store. The connections of the other inputs to the outputs of the elements of the comparison store are such that the circuit 39 supplies to the output K a shift signal when the content of the counter has passed through 20 and not through 31 (I. $\bar{II}$=short interval) or through 36 and not through 47 (III. $\bar{IV}$=long interval). The circuit 40 suppiles at J a 1's introduction signal when the content of the counter has passed through 36 and not through 47 at a bar reading signal.

The shift register 28 is composed of six interconnected bistable stages denoted by A to F to correspond to the intervals of one character. The 1's input of the stage F is connected by the conductor 64 to the output J of the device 27. The shift inputs of all the stages are connected by the conductor 65 to the output K of the device 27. It is known that any pulse applied to the shift inputs has the effect of causing any configuration of 1 and of 0 introduced into or situated in the shift register to progress to the right by one stage, while a pulse applied to the 1's input of the stage F introduces a fresh 1. Each stage is provided with an output from which the information contained in the shift register can be extracted at the desired instant. The outputs of the stages A to E are connected to the inputs of five AND circuits such as 29, of which the outputs are connected to a buffer store 30. The latter is composed of five bistable elements A to E simply having a static storage function.

The transfer of the information contained in the shift register 28 to the buffer register 30 is controlled for one part by the bar counter 31 (FIGURE 2b). The latter is represented as being of the parallel type, composed of three interconnected bistable stages which are allocated to the binary values 1, 2 and 4. Its capacity corresponds to the number of bars of a character. Since its counting rate is much slower than that of the counter 23, it could be of the cascade stage type, that is to say, of the series type. The significant binary-1 outputs are connected to three inputs of an AND circuit 41. The fourth input of the AND circuit 41 receives each delayed reading signal G2 through the conductor 66. One of these pulses can appear at the output of 41 only when the counter 31 has counted the seven bars of a character. This pulse is then transmitted to an input of each of the AND circuits such as 29.

The resetting inputs of the bistable stages of the counter 31 are connected by the conductor 67 to the true output V of the comparison store. The latter supplies a resetting pulse as soon as the comparing device has detected a very long interval, that is to say, when the content of the counter 23 has reached and exceeded 60.

A conductor 68 connects other inputs of the AND circuits 29 to the complementary output terminal $\bar{V}$ of the comparison store 25c. This output terminal supplies an authorising voltage as long as the comparing device has not detected a very long interval. Finally, an inverting or complementing device 42 connects other inputs of the AND circuits 29 to the true output of the stage F of the shift register 28. This arrangement is such that an authorising voltage is supplied to these last outputs only if the stage F has remained in the state 0 when seven bars of a character have been read. The presence of a 1 in this stage at this instant would signify that the character read is a zone symbol (see the code table). Now, the representation of such a symbol must not be transmitted to the buffer store. To sum up, it can be stated that the 1 and 0 configuration contained in the shift register is transmitted to the buffer store only during the reading of the seventh and last bar of a character, before the detection of a very long interval and provided that this configuration corresponds to one of the digits 0 to 9.

It will be observed that if the stage F of the shift register had a complementary output, this output could be directly connected to the left hand inputs of the circuits 29, and the inverting or complementing device 42 could then be omitted.

By way of example, if it is assumed that the time necessary for the state of the comparison store 25c to become stabilised is a pulse period or a cycle of the generator 24, i.e. 5 microseconds, the signal G1 at the output of 26 can be delayed by an equivalent time. The signal G2 can be delayed in relation to the signal G1 by the duration of a pulse, i.e. by 1 or 2 microseconds. The signal $\bar{H}$ will also have to be delayed in relation to the signal G2 by 1 or 2 microseconds so that the comparison store is not reset to zero until after the transfer of the content of the shift register 28 to the buffer register 30.

FIGURE 5 shows a device whose function is to check that every character read comprises two long intervals. The 1 input of a bistable element 43 is connected to the output J of the control device 27. The 0 output of the bistable element 43 is connected to an input of the AND circuit 44. The other input of the latter is connected to the output of the AND circuit 41 (FIGURE 2b). The bistable element 43 constitutes a binary counter. Its 0 output will supply an authorising voltage if it has been returned to zero by two successive pulses each indicating a long interval. The pulse emanating from 41 will then be transmitted by the AND circuit 44 to a non-error detecting device. If the number of long intervals detected in a character were uneven, i.e. 1 or 3, it is clear that the 0 output of the flip-flop circuit 43 would not supply the authorising voltage and would prevent the non-error pulse from being transmitted by 44.

Since the structure of the bistable counting and storing elements may vary in accordance with the applications, it may happen that it is necessary to apply thereto certain additional synchronising signals. It will not be difficult for the person skilled in the art to apply such signals to appropriate points, which signals may be derived from the generator 24.

The operation of the analysing arrangement can rapidly be summarised in relation to the reading of a digit, for example the digit 2 shown in FIGURE 1. It will be assumed that the bars or bar portions of the digit have been appropriately magnetised before the digit 2 passes under the reading head in the travel of the record carrier. It will also be assumed that the bar counter 31 and the buffer store 30 have been reset to zero.

The first reading signal applied to the 0 inputs of the counter 23 have the effect of returning to zero all the stages of the counter. It is to be noted that with certain types of counter the reading signal may occur simultaneously with a pulse emanating from the generator 24. In other types of counter, it is often necessary for the resetting pulse applied to the 0 inputs to be intercalated in time between two counting pulses applied to the 1 inputs.

The content of the counter 23 progresses at the reception of each counting pulse. As soon as it reaches 20, the logical circuit 32 (FIGURE 3) becomes conducting and a pulse is transmitted to the 1 input of the element M1 of the store 25c. The latter thereafter remains in the state 1. When the second bar of the character is read at the end of the interval A, the resultant reading signal arriving through the conductor 61b resets the counter 23 to zero. If the magnetic bars are correct, its content was at this instant 25. When the delayed signal G1 arrives through 63b at the inputs of the control device 27 (FIGURES 2b and 4) only the AND circuit 37 is conducting, because its two inputs connected to the outputs I and $\overline{\text{II}}$ receive an authorising voltage. Therefore, the output K supplies a pulse at the shift inputs of the shift register 28, as a result of the detection of a short interval.

If the shift register theoretically has no stage in the state 1 at this instant, it is of very little importance whether certain stages contain a 1, because in any case if any 1 and 0 configuration is situated therein it will normally be shifted through six stages before the next transfer. This is why the systematic resetting of the shift register is not necessary. The delayed signal G1 will have the effect of introducing a 1 into the bar counter 31, and an instant later the signal $\overline{\text{H}}$ resets to zero the stage M1 of the comparison store.

The content of the counter 23 has commenced to progress again from the beginning of the interval B. It is a question of a long interval. In the course of this progress, some of the logical circuits of the comparing device will become conducting. It is a question of the AND circuits 32, 33 and 34 (FIGURE 3) detecting the values 20, 31 and 36 respectively. The elements M1, M2, M3 pass successively to the state 1. It may be assumed that at the end of the interval B, in the reading of the left-hand edge of the third bar of the digit 2, the content of the counter 23 was at this instant 42, which is the correct mean value. At this instant in the control device 27, the AND circuits 38 and 40 are conducting and the two outputs K and J transmit a pulse resulting from the retarded delayed signal G1, on the one hand to the shift inputs and on the other hand to the 1 input of the stage F of the shift register. Some types of registers adapt themselves to the simultaneous application of these pulses. With other types, it may be necessary to retard the pulses emanating from the output K, which produce the shifting of the information. It will be observed that the detection of a long interval results in the introduction of a 1 into the stage F and in the shifting of the previously stored information to the right by one stage.

The process of interval detection, shifting and introduction of 1's will continue similarly if the character is suitably printed. At the instant of the reading of the last bar of the digit 2, the outputs of the stages B and C of the shift register indicate the presence of a 1, the outputs of the other stages indicating 0's. It is this 1 and 0 configuration, characterising the digit 2, which will be transferred to the buffer store 30 in the manner previously indicated.

Any defects which may occur in the printed characters are of two orders. For example, a bar of magnetic material may be so thick that it becomes confused with a neighbouring bar. The reading device sees these two bars almost as a single bar. The bar counter 31 will reach only the count of 6 at the end of the analysis of the digit and will prevent the transfer of the coded combination to the buffer store. This type of defect will probably also result in the detection of a very long interval in the course of the defective character. The same is the case when a bar is completely lacking from a character. Not only will the transfer to the buffer store be prevented, but the logical circuit 41 will remain non-conducting and the non-error signal cannot be transmitted through the logical circuit 44.

It would have been possible to confine the number of comparison limits to 3, corresponding for example to the minimum widths allocated in principle to the short, long and very long intervals respectively. The comparing device would only comprise three logical circuits having the object of detecting, for example, the counted values 24, 40 and 60. It is obvious that the correctness of the characters could not be checked as strictly and accurately as can be done when using five comparing limits.

With the described arrangement, if it is desired to perfect the checking of the interval values, it is possible to add certain logical circuits for detecting incorrect intervals. For example, by associating the inputs of an AND circuit with the outputs II of M2 and $\overline{\text{III}}$ of M3 (FIGURE 2b), it is possible to detect any erroneous interval between the upper limit of a short interval (31) and the lower limit of a long interval (35). By associating the inputs of another AND circuit with the outputs IV of M4 and $\overline{\text{V}}$ of M5, it is possible to detect any erroneous interval between the upper limit of a long interval (47) and the lower limit of a very long interval (59).

With the arrangement of circuits hitherto described, the comparison limits are predetermined and their choice has determined the connections of the comparison matrix. One of the advantageous aspects of the arrangement is that it can readily be adapted to the use of comparison limits which may be modified in accordance with the type of characters to be analysed.

In this case, the network of circuits of FIGURE 3 would be modified as follows. The five AND circuits 32 to 36 would be replaced by five OR circuits each having six inputs, each OR circuit being allocated to a comparison limit. The inputs of each OR circuit receive the outputs of six AND circuits each having two inputs. The outputs of the bistable elements of the counter 23 separately feed an input of each of the AND circuits in each of the five groups thus formed. In each of these six AND circuits, the other input is connected to the centre contact of an inverter having one pole and two positions. Owing to the previous positioning of these inverters associated with each group, some of these AND circuits can be inhibited, the others being selected by an authorising voltage corresponding with the binary components of the limit chosen for this group.

Thus, the arrangement can analyse characters of types which differ either in their width or in the number or proportions of the intervals, by means of the previous positioning of thirty manual inverters as hereinbefore mentioned.

The second embodiment comprises elements similar to those of the first, namely (FIGURE 6a) the reading head 21, a shaper amplifier unit 22 and delay devices 26, and (FIGURE 6b) the shift register 28, a number of AND circuits such as 29, 41, the buffer store 30 and the counter 43.

The fact that the discrimination of the intervals takes place by an analogue process and not a digital process entails a number of modifications in the connection and the general operation of the various functional elements.

Moreover, a saving of equipment is obtained by reason of the adoption of the so-called arythmic or acyclic technique, which involves the omission of the synchronising or general cyclising arrangement.

The intervals between character strokes are detected by an interval detecting and storing element for each significant interval. Thus, in the case of the very long interval the element in question is composed of a time base 70 called TL, of an amplitude discriminator 71 and of a store 72 called TL. For the long interval, the element is composed of a time base 73 called L, of an amplitude discriminator 74 and of a store 75 called L. A further element 76–78 is provided, not to detect and store a short interval, but to detect any interval shorter than a normal short interval, which would be equivalent to an incorrect character.

The structures of the members of each element are similar. Each time base is a sawtooth wave generator. It may be assumed that when a sawtooth is initiated by an input signal an increasing voltage is available at the output. Another input signal may interrupt the sawtooth and therefore stop the time base at an appropriate instant.

The device called the "discriminator" is also known as an amplitude comparator. It is known to apply a sawtooth wave emanating from the associated time base to the discriminator. The latter generates an output signal, for example a pulse of positive direction, at the precise instant when the voltage level of the sawtooth becomes equal to a predetermined reference voltage.

Each store such as 72 consists of a bistable flip-flop device. Two outputs $e0$ and $e1$ are represented at each flip-flop. Of the two outputs, only the output $s0$ is shown. The input $e1$ may receive from the output of the associated discriminator a pulse capable of changing the flip-flop from the state 0 to the state 1, which indicates that the time limit provided for a given interval has been exceeded between two consecutive strokes.

Each of the stores 72, 75, 78 and 79 consists of such a bistable flip-flop, which is composed essentially, for example, of two transistors and of passive elements. It is well known that when a certain state of conduction is set up in such a flip-flop, a control voltage is available at one of the outputs. By convention, it may be stated that a high voltage is available at the output $s1$ only when the flip-flop is in the state "1." Conversely, an equivalent high voltage is available at the output $s0$ only when the flip-flop is in the state "0."

It is known that it is also possible to derive from these outputs short pulses of given polarity when changes of state are brought about, generally by alternating-current connections. In particular, the voltage variation set up at the output $s0$ of a flip-flop when the latter is reset to the state "0" gives rise to a short pulse of positive direction.

The element 26, which has generally been designated "delay device," may be formed in a number of ways. Having regard to the speed at which the magnetic strokes are read, time delays of 5 $\mu$s., 10 $\mu$s. and 15 $\mu$s., respectively, have been adopted for the delays relative to the outputs $t1$, and $t2$ and $t3$ of the delay devices. They can therefore be made in the form of a delay line provided with two intermediate taps, or in the form of monostable trigger circuits capable of individually generating a pulse of negative direction. The duration of each pulse in the latter case is equal to the desired delay time, and differentiating circuits included in the time bases derive the positive short pulse necessary from the rear flank of the applied rectangular pulse.

It is only for technological reasons that the reading signal pulses must be applied to the different circuits with different delays. It will be seen from FIGURE 6a that the signal delayed by 5 $\mu$s. is applied by the conductor 80a to the input $e0$ of the store 72 (TL) and by the conductor 80b to an input of the logical circuit 81. The signal delayed by 10 $\mu$s. is applied by the conductor 82a to the stop inputs of the time bases 73 (L) and 76 (TC), by the conductor 82b to the inputs $e0$ of the stores 75 (L) and 78 (TC) and finally by the conductor 82c to the shift inputs of the shift register 28 (FIGURE 6b).

Finally, for each reading signal, the signal retarded by 15 $\mu$s. is applied by the conductor 83 to the right-hand or start inputs of the three time bases.

Each undelayed reading signal is applied by the conductor 84 to the stop input of the time base TL.

The shift register 28 is slightly different in this second embodiment in that it comprises seven stages plus one additional stage provided for checking purposes.

There are now provided seven stages, on the one hand to correspond to the number of strokes of each character, and on the other hand because a long interval has artificially been associated with the first stroke of each character read. A delayed reading signal arriving through the conductor 82c is applied to the shift inputs, to the left at each stage, in order to cause the registered information to progress by one stage towards the right. Normally, when a character has been read, the additional "1" representing the additional long interval will have to be registered in the stage D1. Since six shift operations will normally have to follow the initial introduction of this "1" into the register, this process is equivalent to a counting of the strokes of each character. It appears that this solution is particularly economic, because it makes it possible to omit the bar counter represented by 31 in FIGURE 2b.

On the other hand, it is necessary to provide for the systematic resetting of the shift register, which is effected by a pulse of positive direction carried through the conductor 85a.

The outputs of value "1" of the stages D7 to D2 of the register are connected respectively to inputs of the AND circuits 29, of which there are now six. This number corresponds to the case where it is desired to transmit to the buffer store 30 the six code elements defining both the digits and the bordering symbols.

The counter 43 is modified in that it comprises four stages instead of two. Moreover, it is now a question of a pulse counter of the "parallel" type, although this is by no means essential. This means that:

(1) The binary progression is not applied, (2) The active or "1" state exists only in one stage at a time and progresses from one stage to the next stage for each unit counted.

In order to count at most the value 3 (two normal long intervals plus one fictitious long interval), the three stages C1 to C3 would have been sufficient. In order to ensure that there have in fact been three long intervals associated with one character, and not four, a fourth stage C4 has been provided.

The "1" inputs of the counter are connected to the conductor 86a in such manner that its content increases by one unit each time a "1" or long interval is introduced into the shift register. The resetting of the counter is effected at the same time as that of the shift register.

The output s0 of the store 72 (TL) is connected by the conductors 87a, 87b to the centre input of each of the AND circuits 29. The pulse of positive direction set up at this output when the store TL is reset to zero is utilised to effect the transfer of the registered character from the shift register to the buffer store. For this purpose, it is necessary for the other inputs of these AND circuits to receive an authorising voltage from the AND circuit 41. The function of the latter is to check the probability or correctness of the character to be transferred. It must in fact itself receive an authorising voltage at each of its five inputs. An input is connected by the conductor 88 to the output s0 of the store 79 (error) in order to check that there has been no interval shorter than a normal short interval. A second input is connected by the conductor 89 to the output s1 of the stage C3 of the counter 43 in order to ensure that there have in fact been three long intervals in all. A third input is connected by the conductor 90 to the output s0 of the stage C4 of the counter in order to ensure that there have not been four long intervals. A fourth input is connected by the conductor 91 to the output s1 of the stage D1 of the shift register in order to check that there have been seven strokes. Finally, the fifth input of the AND circuit 41 is connected by the conductor 92 to the output s0 of the stage D1' of the shift register in order to check that there have not been eight strokes in the character read.

The members for checking the correctness of the characters are completed by an AND circuit 81 and by the store 79 (error). An input of the AND circuit 81 is connected to the output s0 of the store 78 by the conductor 93. The operation of these members will hereinafter be explained.

The general operation of the second embodiment is similar to that of the first embodiment. It will be noted that any stroke reading signal emanating from the output of the shaper amplifier 22 has the immediate or retarded effect of first stopping the sawtooth waves generated by the time bases and thereafter restarting them.

Normally, in the case of perfectly printed characters, and having regard to the speed of travel of the cheque under the reading head, the time T between two reading signals separated by a long interval is, for example, 138 µs. The time between two reading signals separated by a short interval is 0.6 T.

The time limit allotted to the discriminator 74 is 0.8 T, that is to say, the latter will produce an output pulse even if the true long interval between two strokes is shortened to 0.85 T, for example. Thus, a long interval will be detected even if it has been reduced by about 20% owing to an imperfect printing of the strokes bordering it. Similar tolerances are admissible at the other significant intervals.

The time limit allotted to the discriminator 71 is 1.2 T. This limit must be overstepped normally only for any interval between two consecutive characters.

It may be assumed that the sawtooth of the time base TL is started by any appropriate means (not shown) before the instant when the first stroke of the first character arrives under the reading head. It is obvious that the time limit allotted to a very long interval will be exceeded before this instant. The discriminator 71 therefore generates a pulse of positive direction which brings the store TL to the state 1.

When the first stroke is read, the short pulse resulting from the forward edge of this stroke is transmitted through the conductor 84 to the left-hand input of the time base TL. The saw-tooth wave of the latter is therefore stopped.

The same pulse delayed by 5 µs. is transmitted through the conductor 80a to the input e0 of the store TL, bringing the latter to the state "0." The pulse of positive direction then set up at the output s0 is transmitted by the delay element 94 to the resetting inputs of the shift register, of which all the bistable elements are returned to zero. The use of this same pulse by the other circuits is not effective at this instant and it will be explained in greater detail in the following.

Since the limit allotted to the very long interval will not normally be exceeded, in the course of the reading of the first character, the store TL remains in the stage "0" until the detection of the succeeding very long interval.

As in the case of the other two time bases, the discriminator 74 associated with the time base 73 detects the overstepping of its time limit before the reading of the first stroke of the first characer read, or of the succeeding characters. The pulse of positive direction supplied by this discriminator to the input e1 of the store 75 has the effect of causing the latter to pass to the "1" state, thus registering the fact that there has just been an interval of time considered as "long." In the reading of the first stroke, the delayed signal emanating from the terminal t2 and transmitted by the conductor 82a stops the sawtooth of the time base 73. The same delayed signal carried by the conductors 82a, 82b and 82c resets to zero the store 75 and the shift register 28.

There is set up at the output s0 of the store 75 a pulse of positive direction, which is transmitted through the conductors 86a, 86b to the "1" input of the stage D7 of the shift register 28. The resultant change of the stage D7 to the state "1" constitutes the registration of "1" which at the same time materialises the presence of a long interval and of the first stroke of the character read. Moreover, it will be seen that this same pulse is also applied to the "1" inputs of the counter 43, so that the stage C1 assumes the state "1."

Assuming that the first interval of the character read is a short interval, the store L thereafter remains in the state "0." The delayed signal resulting from the reading of the second stroke and arriving through the conductor 82c produces a shift, so that it is now the stage D6 of the register which contains an "1."

On the other hand, if the first interval is long, the store L changes to the "1" state a time 0.8 T after the first reading signal and when it is reset to zero it produces the introduction of a further "1" into the shift register and into the counter 43.

These two processes are alternately repeated in the course of the reading of the succeeding strokes until, finally a "1 and 0" configuration is registered in the shift register in agreement with the character read.

The time limit allotted to the discriminator 77 is 0.4 T. As long as a short interval is normal or acceptable. the delayed signal emanating from the terminal t2 arrives after the pulse of positive direction generated by the discriminator 77 as a result of the limit TC being exceeded. In other words, as long as there is no excessively short interval, the reading signal delayed by 5 µs. which arrives through the conductor 80b finds the AND circuit 81 in the blocking condition. The second input of this AND circuit must in fact receive at this instant an inhibiting voltage from the output s0 of the store 78, which must still be in the "1" state.

On the other hand, if a too short interval is detected, which generally results from the processed cheque being in a skew position, the time base 76 is stopped before the discriminator 77 has detected that the aforesaid time limit has been exceeded. Consequently, the store 78 is still in the "0" state when the delayed reading signal is set up through the conductor 80b at the left-hand input of the AND circuit 81. The latter is then conducting and transmits the said delayed signal to the input e1 of the "error" store. The latter will remain in the state "1"

until the beginning of the succeeding character, at which instant it will prevent by means of the AND circuit 41 the transfer of the character stored in the shift register.

In normal circumstances, when there has been no error as a result of the reading of the first character, when the signal delayed by 5 μs. emanating from the reading of the first stroke of the second character resets the store 72 (TL) to zero, the resultant pulse is applied through the conductors 87a, 87b to the AND circuits 29 so as to effect the transfer of the character stored in the shift register, with the additional checking of the AND circuit 41.

The relay time produced by the element 94 may be, for example, 2 μs. so as to transmit the said resultant pulse through the conductors 85a, 85b and 85c to the shift register 28, to the counter 43 and to the store 79 in order to reset them to zero.

FIGURE 7 illustrates a second modified embodiment which affords the advantage that it is more economic in equipment while affording equivalent results from the viewpoint of rapidity and reliability. This figure is intended to replace only FIGURE 6a, of which it constitutes the functional equivalent. FIGURE 6b remains applicable in regard to the unmodified elements of the general circuit arrangement.

It will readily be seen in FIGURE 7 that there is only one time base 70. The inputs of the discriminator 71, 74 and 77 receive the sawtooth wave generated by the time base. The discriminator 71 produces an overstepping pulse when the level of the sawtooth reaches a level corresponding to a time equal to 1.2 T, which has hereinbefore been defined. The discriminator 74 produces an overstepping pulse for a level of the sawtooth corresponding to a time equal to 0.8 T. The discriminator 77 produces an overstepping pulse for a level of the sawtooth corresponding to a time equal to 0.4 T. It will readily be appreciated that the processes of detecting very long, long and excessively short intervals are entirely equivalent to those previously described and that the general operation is in no way modified.

It will be obvious that voltages signifying binary values have been mentioned in the foregoing only by way of example. Since the bistable counting and storing elements may be derived from the technology of vacuum tubes, semi-conductors or transistors or even of saturable magnetic cores, all that has been stated with reference to the voltages is applicable to current strengths or magnetisation states, depending upon the construction of the elements employed.

What is claimed is:

1. An analyzing and converting arrangement for analysing characters in relative horizontal movement, each character being composed of a fixed number of vertical bars, the latter having their homologous edges separated by intervals of two different widths with a fixed number of so-called "long" intervals differently located among other intervals called "short" intervals, comprising reading means for generating an effective reading signal for one edge of each bar read, time measuring means connected to said reading means to receive said reading signals for detecting a long interval between two consecutive reading signals and for emitting a distinct pulse upon such detection and including at least one time discriminating means, first storage means connected to said discriminating means for momentarily storing said distinctive pulse, second storage means having several storage positions and switching means which are associated with said second storage means and which are connected to be actuated step-by-step by said reading signals in order to cause said second storage means to store a binary value assigned to such a long interval into appropriate storage positions under control of said first storage means.

2. Arrangement according to claim 1, wherein said second storage means and said switching means are united to form a shift register with shift inputs, connecting means being provided for applying said reading signals to said shift inputs.

3. Arrangement according to claim 2, comprising a buffer store composed of a plurality of bistable stages, control means, and logical switching circuits coupled between said shift register and said buffer store for effecting, under the influence of said control means, the transfer of the content of said shift register into said buffer store.

4. Arrangement according to claim 3, wherein said time measuring means is further adapted to detect a "very long" interval between two consecutive characters, said first storage means being adapted for separately storing a signal indicative of the detection of such a very long interval.

5. Arrangement according to claim 4, including a constant frequency pulse generator, and wherein said time measuring means comprises a pulse counter, connecting means arranged so that said counter receives said constant frequency pulses to be counted during each bar interval and also said reading signals for its resetting to zero, and a plurality of logical circuits connected to appropriate output terminals of the counter for separately detecting count values assigned respectively to a short interval, a long interval and a very long interval, said first storage means including a first bistable element, a second bistable element and a third bistable element for storing the detection of each of said intervals.

6. Arrangement according to claim 5, wherein there are provided an AND circuit connected to transmit a reading signal to an "1" input of said shift register when said second bistable element stores the detection of a long interval, and a combination of two AND circuits and one OR circuit arranged to transmit a reading signal to the shift input of said shift register when the first and/or second of said bistable elements store the detections of a short interval or of a long interval.

7. Arrangement according to claim 6, wherein the control means comprises a binary counter adapted to receive said reading signals and to count up to the normal number of reading signals for one character, and an AND circuit connected to the outputs of said counter to control the passing condition of said logical switching circuits.

8. Arrangement according to claim 4, wherein said time measuring means comprises at least one linear time base generator, and two amplitude discriminators associated therewith for yelding a pulse upon detection of a long interval and of a very long interval respectively between two consecutive reading signals, said first storage means including first and second bistable elements each associated with one of said discriminators for storing said pulse.

9. Arrangement according to claim 8, wherein there are provided connecting means adapted to convey said reading signals for resetting said first bistable element, a pulse counter having "1" inputs connected to an output of said first bistable element so as to count the number of long intervals, and an AND circuit connected to said counter and adapted to control the passing condition of said logical switching circuits.

10. Arrangement according to claim 9, including connecting means for applying reading signals to a reset input of said second bistable element, and further connecting means from an output of said second bistable element adapted to cause the resetting of said shift rigister and of said pulse counter as a result of a reading signal following the detection of a very long interval between characters.

11. Arrangement according to claim 10, including further bistable storage means, a further amplitude discriminator associated with said time base generator and with said further bistable storage means in such a manner that a signal indicative of a too short interval may be stored if a second reading signal occurs before the time limit assigned to a normal short interval.

12. Arrangement according to claim 11, wherein a further input of the AND circuit is connected to an output of said further storage means in such a manner as to prevent the transfer from the shift register to the buffer store when a too short interval has been detected.

References Cited by the Examiner
UNITED STATES PATENTS

| | | | |
|---|---|---|---|
| 2,897,481 | 7/1959 | Shepard | 340—149.1 |
| 2,932,006 | 4/1960 | Glauberman | 340—166 |
| 3,044,696 | 7/1962 | Feissel | 235—61.12 |
| 3,113,298 | 12/1963 | Poland et al. | 340—174.1 |

MAYNARD R. WILBUR, *Primary Examiner.*

WALTER W. BURNS, JR., M. A. MORRISON,
*Examiners.*

J. P. HIRSHKOP, J. S. IANDIORIO, J. E. SMITH,
*Assistant Examiners.*